US011950535B2

(12) United States Patent  
Miller et al.

(10) Patent No.: US 11,950,535 B2  
(45) Date of Patent: Apr. 9, 2024

(54) RAKING DEVICE AND METHOD

(71) Applicants: Janette Miller, Sun Valley, NV (US); Michael Miller, Sun Valley, NV (US)

(72) Inventors: Janette Miller, Sun Valley, NV (US); Michael Miller, Sun Valley, NV (US)

(*) Notice: Subject to any disclaimer, the term of this patent is extended or adjusted under 35 U.S.C. 154(b) by 505 days.

(21) Appl. No.: 17/127,998

(22) Filed: Dec. 18, 2020

(65) Prior Publication Data

US 2022/0192085 A1 Jun. 23, 2022

(51) Int. Cl.
| | |
|---|---|
| *A01D 7/04* | (2006.01) |
| *A01B 1/14* | (2006.01) |
| *A01D 7/06* | (2006.01) |
| *A01B 1/22* | (2006.01) |
| *A01B 1/24* | (2006.01) |
| *A01B 35/08* | (2006.01) |
| *A01B 49/02* | (2006.01) |
| *A01D 7/00* | (2006.01) |
| *A63B 57/50* | (2015.01) |

(52) U.S. Cl.
CPC ............... *A01D 7/04* (2013.01); *A01B 1/14* (2013.01); *A01D 7/06* (2013.01); *A01B 1/22* (2013.01); *A01B 1/24* (2013.01); *A01B 35/08* (2013.01); *A01B 49/02* (2013.01); *A01D 7/00* (2013.01); *A63B 57/50* (2015.10)

(58) Field of Classification Search
CPC ... A01D 7/04; A01D 7/06; A01D 7/00; A01B 1/14; A01B 1/22; A01B 1/24; A01B 35/08; A01B 49/02; A63B 57/50
See application file for complete search history.

(56) References Cited

U.S. PATENT DOCUMENTS

| | | | | |
|---|---|---|---|---|
| 563,281 | A * | 7/1896 | Kuehl | A01D 7/00 172/349 |
| 1,182,153 | A * | 5/1916 | Ellwein | A01D 7/00 403/85 |
| 1,318,765 | A * | 10/1919 | Jones | A01D 7/04 56/400.21 |
| 1,652,260 | A * | 12/1927 | Thompson | A01D 7/04 56/400.21 |
| 1,936,800 | A * | 11/1933 | Moork | A01D 7/10 56/400.08 |
| 2,086,170 | A * | 7/1937 | Muranaka | A01D 7/00 56/400.11 |
| 2,110,538 | A * | 3/1938 | Walsh | A01D 7/00 56/400.21 |
| 2,713,763 | A * | 7/1955 | Holman | A01D 7/10 56/400.1 |
| 2,840,978 | A * | 7/1958 | Spinosa | A01D 7/02 56/400.04 |

(Continued)

FOREIGN PATENT DOCUMENTS

| | | | | |
|---|---|---|---|---|
| CA | 2041557 | A * | 10/1992 | ............... A01B 1/14 |
| FR | 2701350 | A1 * | 8/1994 | ............... A01D 7/00 |

(Continued)

*Primary Examiner* — Arpad Fabian-Kovacs  
(74) *Attorney, Agent, or Firm* — Fish & Richardson P.C.

(57) ABSTRACT

This disclosure relates to a raking device, and in some implementations, a detachable rake head for raking sand traps and its method of use. The raking device may be configured to be releasably attached to a supporting handle (e.g., a broom handle, 5 golf club, golf ball retriever, or other rod-typed structure).

16 Claims, 4 Drawing Sheets

(56) References Cited

U.S. PATENT DOCUMENTS

| | | | | |
|---|---|---|---|---|
| 2,902,815 A * | 9/1959 | Gallo, Sr. | ............... | A01D 7/10 294/50.8 |
| 3,108,426 A * | 10/1963 | Rugg | ............... | A01D 7/02 56/400.21 |
| 3,146,831 A * | 9/1964 | McConnell | ............ | A01G 20/30 172/375 |
| 3,206,921 A * | 9/1965 | Slaga | ............... | A01D 7/00 172/378 |
| 3,431,661 A * | 3/1969 | Carlson | ............... | E01H 5/02 37/278 |
| 3,870,300 A * | 3/1975 | Amendola | ............ | A63B 57/203 473/391 |
| 4,054,313 A * | 10/1977 | Ciuci | ............... | E01C 23/082 172/372 |
| 4,216,831 A * | 8/1980 | Ritchie | ............... | A01D 7/00 172/380 |
| 4,854,592 A * | 8/1989 | Milovic | ............... | A63B 57/50 172/438 |
| 5,311,733 A * | 5/1994 | Krenkel | ............... | A63B 57/50 294/19.2 |
| 5,927,057 A * | 7/1999 | Hueber | ............... | A63B 57/50 56/400.21 |
| 6,058,691 A * | 5/2000 | Greeves | ............... | A63B 57/50 56/400.04 |
| 6,722,115 B2 * | 4/2004 | DeWinter | ............... | A01D 7/10 172/375 |
| 7,299,614 B2 * | 11/2007 | Sanders | ............... | A01D 7/00 56/400.21 |
| 7,343,637 B2 * | 3/2008 | Lafleur | ............... | B25G 1/04 15/105 |
| 9,049,918 B2 * | 6/2015 | Perelli | ............... | A46B 5/0033 |
| 11,066,831 B2 * | 7/2021 | Ramsey | ............... | E04D 13/106 |
| 2010/0127521 A1 * | 5/2010 | Thibault | ............... | A63B 47/02 294/19.2 |
| 2021/0378166 A1 * | 12/2021 | Curran | ............... | A01D 7/04 |

FOREIGN PATENT DOCUMENTS

| | | | | | |
|---|---|---|---|---|---|
| GB | 1517916 A | * | 7/1978 | ............... | A01D 7/04 |
| GB | 2250414 A | * | 6/1992 | ............... | A01D 7/00 |
| GB | 2287631 A | * | 9/1995 | ............... | A01B 1/06 |
| WO | WO-9407353 A1 | * | 4/1994 | ............... | A01D 7/00 |
| WO | WO-2022049261 A1 | * | 3/2022 | ............... | A01D 7/04 |

\* cited by examiner

RAKING DEVICE AND METHOD

TECHNICAL FIELD

This disclosure relates to a raking device, and in some implementations, a detachable rake head for raking sand traps and its method of use.

BACKGROUND

In the sport of golf, one kind of hazard frequently encountered by golfers is the sand trap. A sand trap may be a depression or carve out that is commonly filled with sand or similar material. When a golfer hits a ball out of a sand trap, the golfer will usually disturb the surface of the sand, both through striking the ball as well as walking to and from the spot of the shot. These perturbations in the surface of the sand may make shots by other subsequent golfers more difficult, and as such, it is a common courtesy in golf to rake the surface of the sand trap smooth after the golfer has completed their shot and exited the sand trap.

Traditionally, golf courses would usually provide rakes at the site of sand traps for golfers to use to rake the sand smooth. However, some golf courses removed these courtesy rakes in an effort to help prevent the spread of microbes or viruses, especially during times of a pandemic. Some golf courses have asked golfers to attempt to smooth the surface of sand traps using a golf club or the side of the golfer's shoe. However, these approaches generally have not produced the same smooth surface that raking the sand trap would have provided, thus leaving the sand traps in suboptimal conditions for other golfers. Although a golfer could carry their own personal rake to avoid contamination concerns, golfers rarely do so, as traditional rakes are large and not adapted to fit in golf bags or otherwise be easily transported around the golf course, especially when the golfer is walking and carrying their golf clubs. Further, storing a rake in close proximity to golf clubs and a golf bag may risk the sharp parts of the rake contacting the golf equipment and scratching or otherwise damaging the equipment.

SUMMARY

Some embodiments described herein include an improved detachable raking device with extendable rake tines. In some embodiments, the improved raking device may be configured to be releasably attached to a supporting handle (e.g., a broom handle, golf club, golf ball retriever, or other rod-typed structure). Optionally, the raking device may include a c-shaped support tube and a releasable clamp for securing the raking device to the supporting handle. Thus, should the user prefer to transport and store the raking device in a golf bag or pocket when not in use, the user may advantageously re-attach the raking device to the supporting handle, such as another golf club, ball retriever, or similar device, when encountering a sand trap. Optionally the detachable raking device may be used for raking other surfaces besides sand traps, such as gardens, pebbles, and other sand or granular media features. In other embodiments, other types of attachment mechanisms may be used, such as twist-to-lock friction fittings, screw-type clamps, quick release, or other attachment media. Similarly, in some embodiments a cylinder may be used in place of the c-shaped support tube, or the c-shaped support tube may be replaced with a series of c-shaped clamps in other embodiments.

In some embodiments, the raking device further includes collapsible rake head arms. In such embodiments, during storage and transport, the collapsible rake hard arms are retracted and positioned parallel to the raking device body (and supporting handle, if attached). When the user desires to use the raking device, the user may rotate the rake head arms to a position perpendicular to the raking device body (and supporting handle, if attached). When the user has finished using the raking device, the user may rotate the rake head arms back into the collapsed position. In this manner, when in the stored position, the raking device is compact and easily transportable in a golf bag, or if detached from the supporting handle, in a pocket or clipped to the side of the bag. Likewise, the raking device may easily and quickly be extended to the open position when the user needs to rake a sand trap.

In certain embodiments the rake head arms are manually extendable by the user from the collapsed to the extended position, and vice versa. In particular implementations, the rake head arms may include a twist-to-lock mechanism for securing the rake head arms in the extended position, such that they do not fall or are not pushed back into the collapsed position during raking. In other embodiments, the raking device may include a manual slider, lever, or spring-loaded deployment mechanism for automatically extending the rake head arms. For example, the rake head device may optionally include a rake head arm extension button mechanically coupled to the rake head arms by one or more coil springs. In such embodiments, when the user depresses the rake head arm extension button, the tension in the coil spring is released, driving the rake head arms from the collapsed to the extended position. In some embodiments, the coil springs may interact with a rotational cable to rotate the rake head arms and lock them in place as they are rotated to the extended position.

In some embodiments, a slider may also be included on the raking device that is driven from a first position to a second position by the coil spring(s), and a second, retractions button on the raking device. In these embodiments, when the user desires to return the rake head arms from the extended to collapsed position, the user may depress the retraction button and pull down on the slider. This will release the twist-to-lock mechanism and pull on the rotational cable and coil springs, rotating the rake head arms back from the extended to the collapsed position. Then, the slider may lock back in the first position, placing the coil springs in a tensed position and readying the raking device for subsequent deployment the next time the user encounters a sand trap and needs to extend the rake head arms.

Optionally, the rake head arms may further comprise extendable raking tines. In such embodiments, when the rake head arms are in the collapsed position, the raking tines are retracted into the rake head arms, thereby reducing the risk that the raking device will cause damage to other golf equipment or inadvertently harm the user. When the rake head arms are rotated to the extended position, the raking tines are also extended from the rake head arms so that the user may use the rake to fix the surface of a sand trap. In some embodiments, the rotation of the rake head arms to the extended and locked position automatically causes extension of the raking tines (e.g., through rotation of the twist-to-lock mechanism securing the extendable rake head arms to the rest of the raking device). Likewise, when the user rotates the rake head arms into the collapsed position, the raking tines may be automatically retracted into the rake head arms by the reverse operation of the twist-to-lock mechanism. In other embodiments, the raking tines may be manually extended through, for example, a second slider on the raking device, or rotational collars on the rake head arms themselves.

Particular embodiments described herein include a rake device having a rake body having a lock collar slot. Some embodiments may further optionally comprise a plurality of extendable rake heads hingedly coupled to the rake body with a plurality of raking tine apertures and a plurality of extendable raking tines. In some embodiments, the extendable raking tines extend through the plurality of raking tine apertures in response to rotation of the extendable rake heads from a first position substantially parallel to a major axis of the rake body to a second position substantially perpendicular to the major axis of the rake body. Optionally, the rake device may include a rotatable lock collar coupled to the extendable rake heads and positioned to mate with the lock collar slot responsive to said rotation of the extendable rake heads to the second position.

Some embodiments may include a method of raking a granular surface comprising method of raking a granular material comprising inserting a supporting handle into a detachable rake device, the rake device having a rake body with a lock collar slot. In some embodiments, the method may further optionally include the step of extending a plurality of extendable rake heads hingedly coupled to the rake body from a first position substantially parallel to a major axis of the rake body to a second position substantially perpendicular to the major axis of the rake body. In some implementations, the method may further include extending a plurality of extendable raking tines through a plurality of raking tine apertures, wherein the extendable raking tines extend through the plurality of raking tine apertures in response to rotation of the extendable rake heads. Optionally, the method may include the step of engaging a rotatable lock collar coupled to the extendable rake heads with the lock collar slot in response to said rotation of the extendable rake heads to the second position and raking a granular surface.

A number of embodiments described herein may provide one or more of the following advantages. First, some embodiments provide a detachable raking device that may be carried by a golfer and releasably attached to a supporting arm, such as a broom handle or other golf club, broom handle, ball retriever, or other supporting device when the user needs to rake a sand trap. This allows the user to maintain the surface of the sand trap while avoiding the use of communal rakes that may pose a risk for the spread of microbes, viruses, or other disease-causing germs. Second, the raking device may comprise in some embodiments collapsible rake head arms that may be extended from a collapsed position for transport, to an extended position for use. This allows the user to carry the raking device in a golf bag in a compact manner and extend the rake head arms only when the user needs to use the rake, such as at a sand trap. Third, particular embodiments of the raking device may include extendable raking tines, which are retracted into the rake head arms during transport and only extended when the rake head arms are placed in the extended position for use. These extendable tines reduce the chance that the raking device (and its tines) will cause damages to other golf equipment or the user's golf bag during transport, and similarly reduces the chance that the raking tines would catch on or scratch the user.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
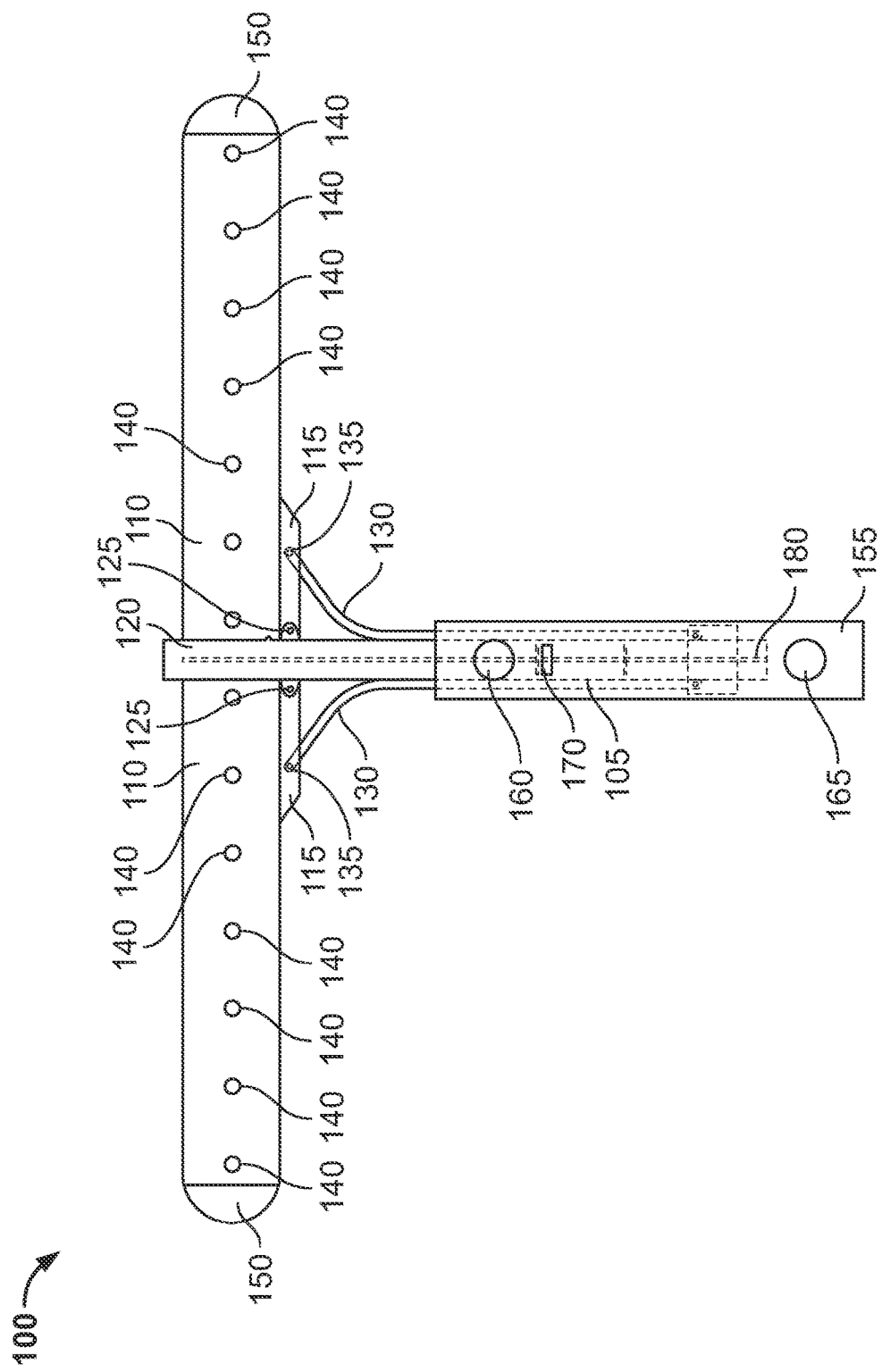
FIG. 1 shows a front view of one embodiment of an improved raking device with rake head arms in the extended position.
Figure 2:
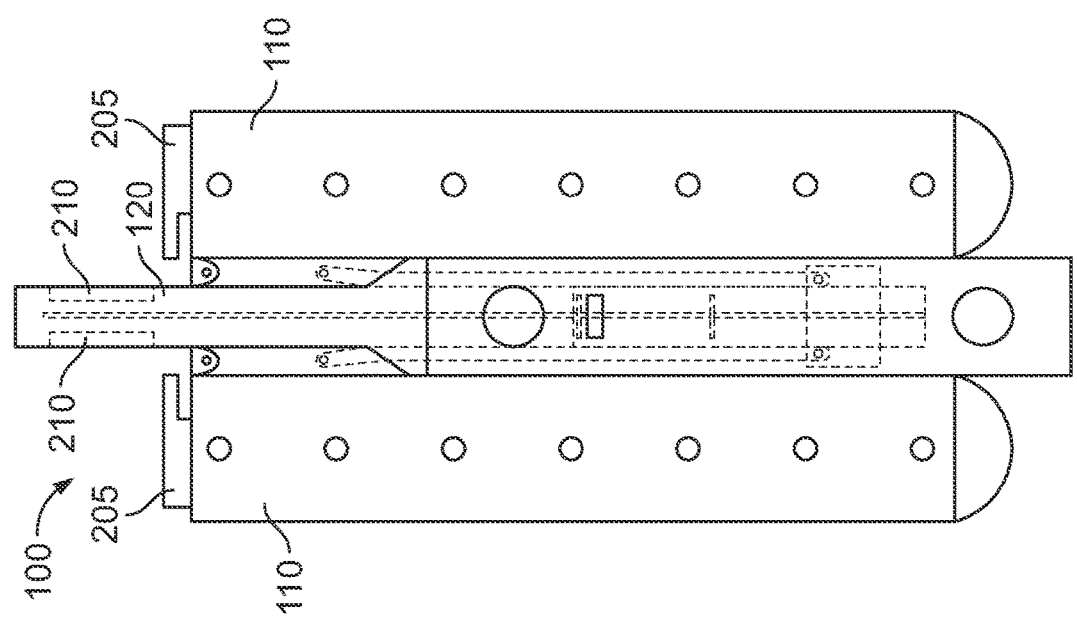
FIG. 2 shows a front view of the improved raking device of FIG. 1 with the rake head arms in the collapsed position.

Referring to FIG. 1, an embodiment of an improved raking device 100 is shown. As shown in FIG. 1, improve raking device 100 may comprise a body 105, and a plurality of extendable rake heads 110. In some embodiments, extendable rake heads 110 are configured to be rotatable between an extended position (such as shown in FIG. 1) and a retracted position (such as shown in FIG. 2). Returning now to FIG. 1, extendable rake heads 110 may be configured to transition from a retracted position to an extended position in a number of ways. As shown in FIG. 1 for example, extendable rake heads 110 may comprise tab 115 attached to the lower end of extendable rake heads 110. In turn, tab 115 may be hingedly connected to beam 120 of raking device 100 by pivot point 125. Tab 115 may also be connected, in some embodiments, to beam 120 of raking device 100 by actuator rod 130, which in turn may be connected to tab 115 by pin 135. When extendable rake heads are moved from the retracted to the extended position, tab 115 may rotate with respect to beam 120 by action of actuator rods 130 and pivot points 125. In other embodiments, other hinged connections, such as ball joints, single hinges, and other attachment mechanisms, may be used.

As can be further seen in FIG. 1, extendable rake heads 110 may further comprise a plurality of apertures 140. Apertures 140 may be configured to receive a plurality of raking tines 710 which may extend through apertures 140 during use and allow for the raking of sand in a sand trap with raking device 100. In some embodiments, extendable rake heads 110 may include end cap 150, which attaches to additional components of extendable rake heads 100 (described in more detail below in connection with FIGS. 8-9). In some embodiments, end cap 150 may further include an elastomeric plug (not shown) that may be removed to allow drainage of water, sand, or other material from the interior of extendable rake heads 110.

Still referring to FIG. 1, improved raking device 100 may further comprise handle 155. Handle 155 may be coupled in some embodiments to beam 120. As shown in FIG. 1, handle 155 may comprise a number of buttons and sliders, such as retraction button 160, extension button 165, and slider 170. In some embodiments, handle 155 may further comprise a non-slip coating or non-slip layer to provide additional gripping support during use.

As is further shown in FIG. 1, improved raking device 100 may include a number of springs and rotational cables for the automatic extension and rotation of extendable rake arms 110. Of course, in some embodiments, extendable rake arms 110 may be manually rotated from a retracted position (parallel to beam 120, as is shown in FIG. 2), to an extended position (as is shown in FIG. 1). However, in other embodiments, a number of springs, buttons, and rotational cables, such as shown in FIG. 1, may be implemented in order to allow for automatic extension and/or retraction of extendable rake head arms 110.

For example, improved raking device 100 may include extension button 165. When a user depressed extension button 165, a coil spring 180, may release its tension and drive rake heads 110 from the retracted to the extended position. At the same time, in some embodiments, slider 170 may be driven forward by the action of coil spring 180 to rotate rake heads 110 and lock them in position with respect to beam 120 (such as, for example, through the use of a rotational friction-fit lock). Optionally, this action may also cause rake tines to extend from apertures 140 from rake heads 110. In some embodiments, slider 170 may be mechanically coupled to rake heads 110 by rotational cable 175, as shown in FIG. 3, and the movement of slider may cause rotational cable 175 to extended or retract, causing rake heads 110 to rotate one direction or the other, depending on if they are being extended or retracted.

In some embodiments, improved raking device 100 may further include retraction button 160. During use, a user may, in some embodiments, depress retraction button 160 in order to release coil spring 180. A user may then pull down on slider 170, which will pull on rotational cable 175, retracting the raking tines and unlocking rake heads 110 from beam 120. Further, slider 170 may be mechanically coupled to coil springs and the action of returning slider 170 to the original position will provide tension on coil spring 180, as well as rotate extendable rake head arms 110 to the retracted position.

Referring now to FIG. 2, the improved raking device of FIG. 1 is shown with extendable rake heads 110 in the collapsed position, such that extendable rake heads 110 are parallel to beam 120. As can be further seen in FIG. 2, extendable rake heads 110 optionally comprise rotational locking collar tabs 205. As further shown in FIG. 2, beam 120 may optionally include complementary locking collar slots 210. During operation, as extendable rake heads 110 swing from the collapsed to the extended position, rotational locking collar tabs 205 will engage with locking collar slots 210. Then, when rotational cable 175 is actuated to cause rake heads 110 to rotate, this will also cause locking collar tabs 205 to rotate within locking collar slots 210. In this manner, extendable rake heads 110 may be temporarily fixed into the extended position, such that use of the rake to rake a sand trap will be less likely to inadvertently push one or both of extendable rake heads 110 out of the extended position.

Figure 3:
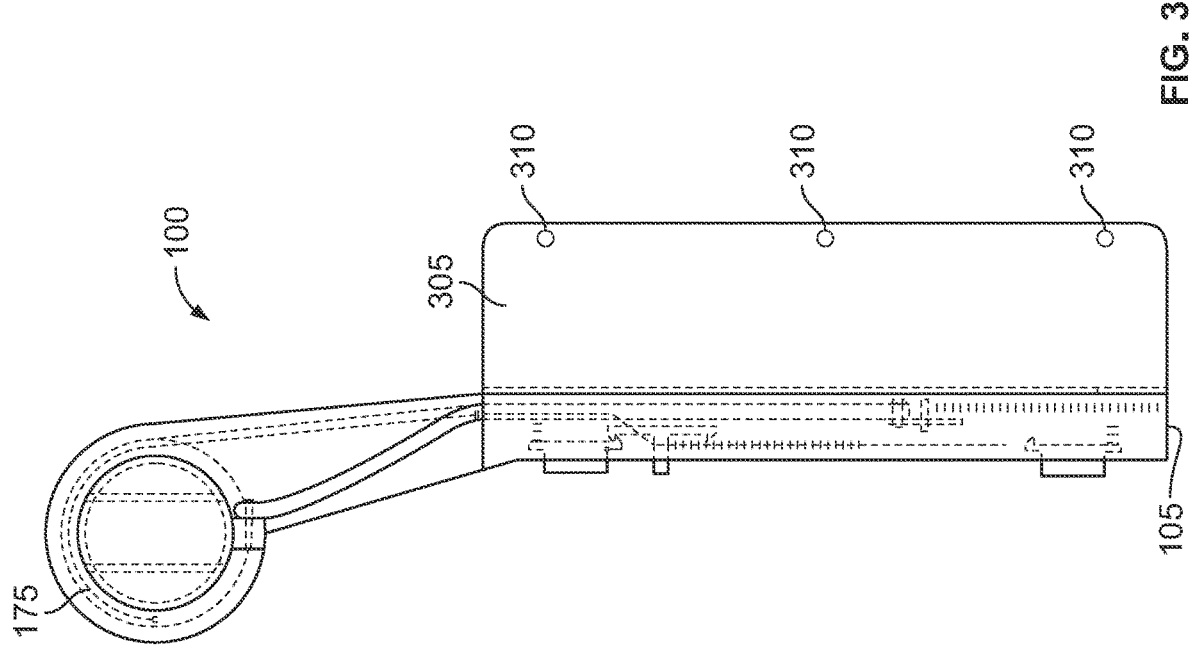
FIG. 3 shows a side view of a portion of the improved raking device of FIG. 1.

Turning to FIG. 3, an alternative perspective of an embodiment of improved raking device 100 is shown. FIG. 3 shows an embodiment of improved raking device 100 from FIG. 1 from a side-on view. As can be seen in FIG. 3, some embodiments of improved raking device 100 may include c-shaped support tube 305 coupled to body 105 for securing raking device 100 to a supporting handle (not shown). In some embodiments, c-shaped support tube 305 may extend substantially the full length of body 105, in order to provide additional support when raking device 100 is secured to a supporting handle. In other embodiments, c-shaped supporting tube 305 may be sized shorter than body 105. As further shown in FIG. 3, c-shaped supporting tube 305 may comprise one or more bolt holes 310, which may be configured to receive bolts for tightening c-shaped support tube 305 onto a supporting handle. In other embodiments, other types of attachment mechanisms may be used, such as twist-to-lock friction fittings, screw-type clamps, quick release, or other attachment media. Similarly, in some embodiments a cylinder may be used in place of the c-shaped support tube, or the c-shaped support tube may be replaced with a series of c-shaped clamps. In some embodiments, c-shaped support tube 305 may further include a non-slip or similar coating in order to provide additional friction and gripping when used with a supporting handle.

Figure 4:
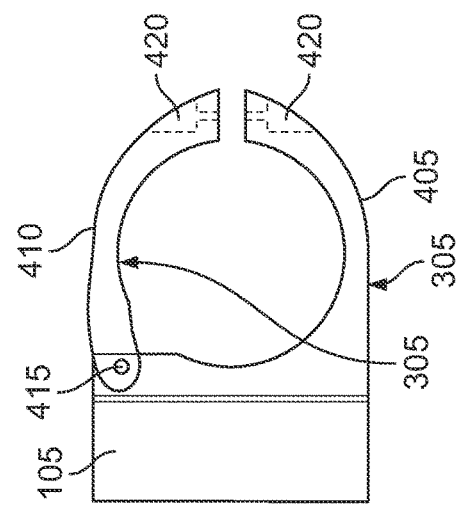
FIG. 4 shows a perspective view of the releasable clamping mechanism of the improved raking device of FIG. 1.

FIG. 4 shows a top-down view of one embodiment of c-shaped supporting tube 305. As shown in FIG. 4, in particular implementations, c-shaped supporting tube 305 may comprise two arms 405 and 410. Arm 405 may be coupled to body 105, and arm 410 may then be coupled to arm 405 by pivot pin 415. In this manner, arm 405 is fixed to body 105, but arm 410 may rotate about the axis created by pivot pin 415 in order to accommodate a variety of different sizes of supporting handles (not shown). Optionally, arms 410 and 405 may include recesses 420 configured to receive an attachment bolt (not shown) that may be tightened to secure arms 405 and 410 around a supporting handle. In other embodiments, clamps, clips, or other attachment media may be used in place of an attachment bolt.

Figure 5:
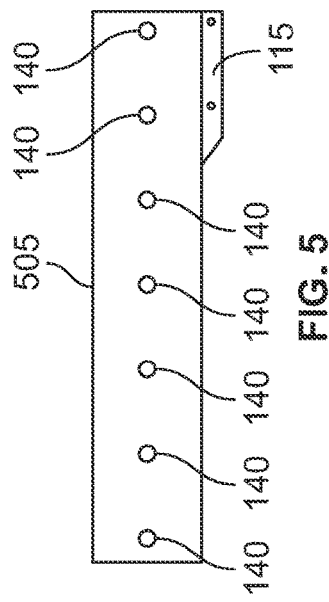
FIG. 5 shows another perspective view of a portion of one of the rake head arms of the improved raking device of FIG. 1.
Figure 6:
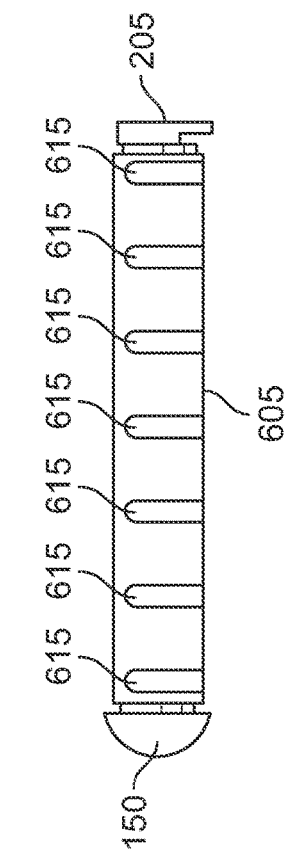
FIG. 6 shows another perspective view of a portion of one of the rake head arms of the improved raking device of FIG. 1.
Figure 7:
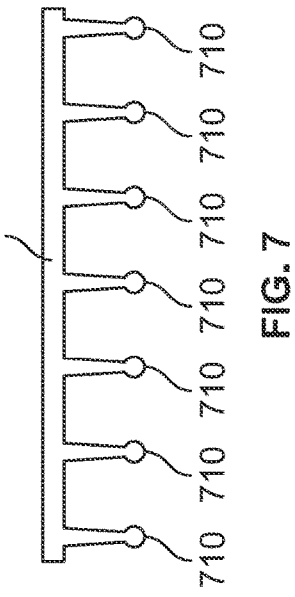
FIG. 7 shows another perspective view of the extendable tines of the improved raking device of FIG. 1.

FIGS. 5-9 show additional details of particular embodiments of extendable rake heads 110. As shown in FIGS. 5-7, extendable rake heads 110 may comprise an outer tube 505, an inner tube 605, and a raking tine bar 705. As shown in FIG. 5 and FIG. 7, outer tube 505 may include a plurality of apertures 140, which, as described above, are configured to allow for the extension and retraction of raking tines 710 through outer tube 505. As described above, outer tube 505 may also include tab 115 for connecting outer tube 505 to actuator rods 130.

Turning now to FIG. 6, extendable rake heads 110 may comprise inner tube 605 located inside of outer tube 505 (not shown in FIG. 6). As shown in FIG. 6, inner tube 605 may have locking collar tab 205 coupled to one end of inner tube 605. By the action of rotational cable 175, inner tube 605 will rotate with respect to outer tube 505. As described above, this motion may, in particular implementations, rotate locking collar tab 205 with respect to complementary locking collar slot 210 on beam 120 (not shown). An end cap 150 may be coupled to the other end of inner tube 605.

As shown in FIG. 7, tine bar 705 may include a plurality of raking tines 710. In some embodiments, tine bar 705 is located within inner tube 605. In turn, inner tube 605 may include a plurality of slots 615, which are sized to allow for raking tines 710 on tine bar 705. During operation, the rotation of inner tube 605 with respect to tine bar 705 will cause raking tines 705 to shift within slots 615, thereby extending or retracting with respect to apertures 140. For example, when extendable rake heads 110 are transitioned from the collapsed to the extended position, rotational cable 175 will cause inner tube 605 to rotate with respect to outer tube 505 and tine bar 705, thereby causing raking tines 710 to extend through apertures 140. In other embodiments, inner tube 605 may be rotated manually, such as by rotating end cap 150, to extend raking tines 710. In some embodiments, when extendable rake heads 110 are transitioned from the extended to the collapsed position, the movement of rotational cable 175 will cause inner tube 605 to rotate back the other direction, thereby causing raking tines 710 to retract into apertures 140.

Figure 8:
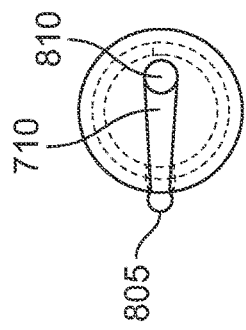
FIG. 8 shows an alternative perspective view of a portion of one of the rake head arms of the improved raking device of FIG. 1 with the extendable tines in the retracted position.
Figure 9:
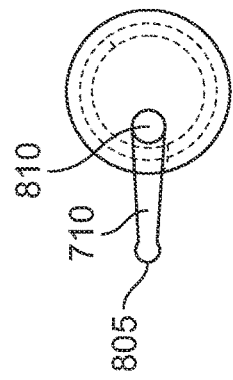
FIG. 9 shows an alternative perspective view of a portion of one of the rake head arms of the improved raking device of FIG. 1 with the extendable tines in the extended position.

FIGS. 8 and 9 show an end-on view of an embodiment of extendable rake head 110. FIG. 8 shows an example of extendable rake head 110 when extendable rake head 110 is in the collapsed position, with raking tines 710 retracted. FIG. 9 shows an example of extendable rake head 110 when extendable rake head 110 is in the extended position, with raking tines 710 extended. As shown in FIG. 8, raking tines 710 may include, in some optional embodiments, hemispherical tips 805 so as to reduce the risk that raking tines 710 catch on or damage other equipment during storage and transportation. As further shown in FIG. 8, in the retracted position, raking tines 710 may be sized so as to slightly protrude from apertures 140. This may reduce the chance that raking tines 710 snag or otherwise get caught on apertures 140 during movement.

As shown in FIGS. 8 and 9, raking tines 710 may also include hemispherical ends 810 on the lower end of raking tines 710. In some embodiments, hemispherical ends 810 may be sized to fit against an inner edge of apertures 140 when raking tines 710 are extended, thus reducing the risk of sand or other debris entering into extendable rake head 110 and interfering with the mechanism.

In use, the embodiments depicted in FIGS. 1-9 can be used by a user for raking a sand trap or other granular surface with a compact extendable improved raking device.

In one example, a user may secure improved raking device 100 to a supporting handle. In particular implementations, a user may slide a supporting handle into c-shaped supporting tube 305 and secure the supporting handle to the improved raking device 100 by tightening fasteners or clamps on c-shaped supporting tube 305, such as, for example, by tightening bolts into one or more recesses 420. Optionally, the user may then rotate extendable rake heads 110 from a collapsed position (parallel to beam 120 of improved raking device 100) to an extended position perpendicular to beam 120. In some embodiments, a user may transition rake heads 110 from a collapsed to extended position by depressing extension button 165. In turn, extension button 165 may release the tension in coil spring 180 and drive rake heads 110 from the retracted to the extended position. At the same time, in some embodiments, slider 170 may be driven forward by the action of coil spring 180 to rotate rake heads 110 and lock them in position with respect to beam 120 (such as, for example, through the use of a rotational friction-fit lock). Optionally, this action may also cause rake tines to extend from apertures 140 from rake heads 110. A user may then rake the sand trap or other surface. Then, in some embodiments, a user may return extendable rake heads 110 to the collapsed position by pressing retraction button 160. Optionally, a user may then pull down on slider 170, which will pull on rotational cable 175, retracting the raking tines and unlocking rake heads 110 from beam 120.

A number of embodiments have been described. Nevertheless, it will be understood that various modifications may be made without departing from the scope of the following claims.

What is claimed is:

1. A rake device comprising:
a rake body having a lock collar slot;
a plurality of extendable rake heads hingedly coupled to the rake body and rotatable from a first position substantially parallel to a major axis of the rake body to a second position substantially perpendicular to the major axis of the rake body;
wherein the extendable rake heads comprise a plurality of raking tine apertures and a plurality of extendable raking tines, wherein the extendable raking tines are configured to extend through the plurality of raking tine apertures;
a rotatable lock collar coupled to the extendable rake heads and positioned to mate with the lock collar slot responsive to said rotation of the extendable rake heads to the second position;
an extension button on the rake body mechanically coupled to a coil spring to actuate the extendable rake heads from the first position to the second position;
and a rotational cable mechanically coupled to the extension button so as to shift the extendable raking tines within the plurality of raking tine apertures from a retracted position to an extended position in response to movement of the extendable rake heads from the first position to the second position.

2. The rake device of claim 1, wherein each extendable rake head comprises an outer body and an inner body rotatable relative to the outer body.

3. The rake device of claim 2, wherein each of the respective extendable rake heads further comprises an extendable raking tine bar that is located within the inner body and supports the extendable raking tines for said respective extendable rake head.

4. The rake device of claim 1, where the extendable rake heads are manually rotatable from the first position to the second position.

5. The rake device of claim 1, wherein each of the extendable raking tines comprise a raking tip and a base.

6. The rake device of claim 5, wherein the raking tip of each extendable raking tine is hemispherical.

7. The rake device of claim 1, wherein the extendable raking tines move relative to the plurality of raking tine apertures from a retracted tine position to an extended tine position in response to rotation of the extendable rake heads from the first position to the second position.

8. The rake device of claim 1, wherein the extendable raking tines are contemporaneously slidable within the plurality of raking tine apertures from a retracted tine position in which at least a majority of each extendable raking tine is retracted inwardly from a corresponding one of the raking tine apertures to an extended tine position in which at least the majority of each extendable raking tine is extended outwardly from the corresponding one of the raking tine aperture.

9. The rake device of claim 1, wherein the extendable raking tines are moveable relative to the plurality of raking tine apertures from a retracted position in which a majority of a longitudinal length of each extendable raking tines is substantially withdrawn into a corresponding one of the raking tine apertures to an extended position in which the majority of the longitudinal length of each extendable raking tine extends through the corresponding one of the raking tine apertures.

10. A method of raking a granular material comprising:
inserting a supporting handle into a detachable rake device, the rake device having a rake body with a lock collar slot;
extending a plurality of extendable rake heads hingedly coupled to the rake body from a first position substantially parallel to a major axis of the rake body to a second position substantially perpendicular to the major axis of the rake body, wherein the step of extending the plurality of extendable rake heads comprises depressing an extension button on the rake body to actuate the extendable rake heads from the first position to the second position
engaging a rotatable lock collar coupled to the extendable rake heads with the lock collar slot in response to said rotation of the extendable rake heads to the second position;
extending a plurality of extendable raking tines through a plurality of raking tine apertures on the extendable rake heads, wherein the step of extending the plurality of extendable raking tines comprises a rotational cable mechanically coupled to the extension button to shift the extendable raking tines relative to the plurality of raking tine apertures from a retracted position to an extended position in response to movement of the extendable rake heads from the first position to the second position; and
contacting the extendable raking tines to the granular material.

11. The method of claim 10, wherein each extendable rake head comprises an outer body and an inner body rotatable relative to the outer body.

12. The method of claim 11, wherein each of the respective extendable rake heads further comprises an extendable raking tine bar that is located within the inner body and supports the extendable raking tines for said respective extendable rake head, wherein movement of the extendable raking tine bar relative to the plurality of raking tine apertures causes the extendable raking tines to collectively move from a retracted position to an extended tine position in which end tips of the extendable raking tines are adjusted outwardly from the plurality of raking tine apertures.

13. The method of claim 10, wherein the step of extending the plurality of extendable rake heads hingedly coupled to the rake body from a first position substantially parallel to a major axis of the rake body to a second position substantially perpendicular to the major axis of the rake body comprises manually rotating the extendable rake heads from the first position to the second position.

14. The method of claim 10, wherein the step of extending the plurality of extendable raking tines through the plurality of raking tine apertures on the extendable rake heads is responsive to manually rotating an end cap of each of the plurality of extendable rake heads to extend the raking tines.

15. The method of claim 10, wherein each of the extendable raking tines comprise a raking tip and a base.

16. The method of claim 15, wherein the raking tip of each extendable raking tine is hemispherical.

* * * * *